United States Patent
Ho et al.

(10) Patent No.: US 9,584,327 B2
(45) Date of Patent: Feb. 28, 2017

(54) SYSTEM AND METHOD FOR AUTHENTICATION FOR TRANSCEIVERS

(71) Applicants: Alexander Channing Ho, Menlo Park, CA (US); Hugh W. Holbrook, Palo Alto, CA (US); Lorenz Wolfgang Redlefsen, Austin, TX (US)

(72) Inventors: Alexander Channing Ho, Menlo Park, CA (US); Hugh W. Holbrook, Palo Alto, CA (US); Lorenz Wolfgang Redlefsen, Austin, TX (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 14/448,873

(22) Filed: Jul. 31, 2014

(65) Prior Publication Data
US 2015/0039894 A1  Feb. 5, 2015

Related U.S. Application Data

(60) Provisional application No. 61/860,432, filed on Jul. 31, 2013.

(51) Int. Cl.
H04L 29/06 (2006.01)
H04L 9/32 (2006.01)
H04B 1/38 (2015.01)

(52) U.S. Cl.
CPC .............. *H04L 9/3247* (2013.01); *H04B 1/38* (2013.01)

(58) Field of Classification Search
CPC .......... H04L 9/3247; H04B 1/38; G06F 21/85
USPC ........................................................ 726/22
See application file for complete search history.

(56) References Cited

U.S. PATENT DOCUMENTS

| | | | |
|---|---|---|---|
| 5,948,136 A * | 9/1999 | Smyers | H04L 12/40058 710/107 |
| 7,234,061 B1 | 6/2007 | Diab et al. | |
| 8,165,297 B2 * | 4/2012 | Hoffmann | H04L 9/3263 380/256 |
| 2003/0071717 A1 * | 4/2003 | Hagl | B60R 25/24 340/5.61 |
| 2003/0112975 A1 * | 6/2003 | Taiwanese | H04L 9/32 380/270 |
| 2004/0008996 A1 * | 1/2004 | Aronson | G02B 6/4246 398/202 |
| 2005/0071129 A1 * | 3/2005 | Yeap | G06F 21/335 702/188 |
| 2005/0113068 A1 * | 5/2005 | Hoffmann | H04L 9/3271 455/411 |

(Continued)

*Primary Examiner* — Syed Zaidi
(74) *Attorney, Agent, or Firm* — Blakely, Sokoloff, Taylor & Zafman LLP

(57) ABSTRACT

A method and apparatus of a network element that authenticates a transceiver and/or a field replaceable unit of the network element is described. The network element generates a stored transceiver signature using transceiver data stored in the removable transceiver and a nonce. In addition, the network element generates a hardware transceiver signature using data stored in secure storage of the network element and the nonce. If the stored transceiver signature and the hardware transceiver signature are equal, the network element uses the transceiver to communicate network data for the network element. Otherwise, the network element disables the transceiver.

20 Claims, 10 Drawing Sheets

(56) References Cited

U.S. PATENT DOCUMENTS

| | | | | |
|---|---|---|---|---|
| 2008/0267408 | A1* | 10/2008 | Hsieh | H04L 9/3271 380/278 |
| 2009/0138709 | A1* | 5/2009 | Ekkizogloy | H04B 10/40 713/168 |
| 2009/0240945 | A1* | 9/2009 | Aronson | H04L 63/08 713/176 |
| 2010/0325298 | A1* | 12/2010 | Nelson | H04L 63/126 709/229 |
| 2010/0325432 | A1* | 12/2010 | Tang | G06F 21/85 713/168 |
| 2012/0051490 | A1* | 3/2012 | Hussain | G06F 21/86 377/15 |

* cited by examiner

SYSTEM AND METHOD FOR AUTHENTICATION FOR TRANSCEIVERS

RELATED APPLICATIONS

Applicant claims the benefit of priority of prior, co-pending provisional application Ser. No. 61/860,432, filed Jul. 31, 2013, the entirety of which is incorporated by reference.

FIELD OF INVENTION

This invention relates generally to data networking and more particularly relates to authenticating a transceiver and/or a field replaceable unit of a network element.

BACKGROUND OF THE INVENTION

A modern network element is usually composed of multiple different field replaceable components. For example, a 1U high network element would have one or more removable transceivers (e.g., a small-form pluggable (SFP) transceivers) that can be removed and/or replaced at a customer premise. In addition, a multiple card chassis network element can include removable line cards, control cards, power supplies as well as removable transceivers on the lines and the chassis.

As a network element becomes more popular, the incentive for counterfeiting the removable network element components increases. For example, a transceiver may be counterfeited by an unscrupulous outfit that purchases cheap transceivers of dubious quality and learns how to reprogram the identifier (ID) Electrically Erasable Programmable Read Only Memory (EEPROM) chip that is used to store the identifier information for the transceiver. This can happen by this outfit purchasing an authentic transceiver and dumping the contents of the ID EEPROM using an inexpensive protocol analyzer. This outfit can now program an unlimited number of cheap transceivers by essentially cloning the EEPROM contents on the transceiver. By adding counterfeit stickers to the transceiver, these parts can be added into the sales channel.

Alternatively, unscrupulous employees at a contract manufacturer can illicitly obtain modules from a transceiver assembly line. For example, transceivers may be rejected during manufacturing or the assembly line may continue to produce additional transceivers beyond the official count requested by the transceiver producer. Because these parts come from an official production line, these parts contain hardware and software identical to authentic transceivers.

Another way of counterfeiting a transceiver is to snoop on the bus between the transceiver and the network element and record the transactions between the transceiver and the network element. The counterfeiter can adapt a counterfeit transceiver or create a new one from scratch to replay the previously recorded messages.

Similarly, an unscrupulous party can counterfeit the field replaceable units of a network element, such as removable line cards, control cards, power supplies, fan modules, and the chassis. It would be useful to detect counterfeit components of a network element so as to disable these components in order to ensure that the components used by the network element are authentic.

SUMMARY OF THE DESCRIPTION

A method and apparatus of a network element that authenticates a transceiver and/or a field replaceable unit of the network element is described. In an exemplary embodiment, a network element generates a stored transceiver signature using transceiver data stored in the removable transceiver and a nonce. In addition, the network element generates a hardware transceiver signature using data stored in secure storage of the network element and the nonce. If the stored transceiver signature and the hardware transceiver signature are equal, the network element uses the transceiver to communicate network data for the network element. Otherwise, the network element disables the transceiver.

In another embodiment, the network element authenticates a removable transceiver coupled to the network element by detecting the removable transceiver coupled to the network element, where the transceiver is not authorized to communicate traffic for the network element. The network element further authenticates the removable transceiver using encrypted data stored in the removable transceiver and unencrypted data stored in the network element. If the removable transceiver is authenticated, the network element communicates data using the removable transceiver. If the removable transceiver is not authenticated, the network element disables the removable transceiver.

In a further embodiment, the network element authenticates a field replaceable unit of the network element by generating a nonce. In addition, the network element generates a signature using the nonce and a private encryption key that is securely stored in the field replaceable unit. The network element further verifies the signature using a public encryption key that is a pair to the private encryption key and is not securely stored in the field replaceable unit. If the field replaceable unit is verified, the network element uses the field replaceable unit to operate the network element. Otherwise, the network element disables the field replaceable unit.

In another embodiment, the network element authenticates a field replaceable unit of the network element by detecting the field replaceable unit in the network element, where the field replaceable unit includes a security chip and stored manufacturing data. The network element validates the stored manufacturing data using cryptographically signed manufacturing data. In addition, the network element validates the security chip. If the stored manufacturing data and the security are validated, the network element uses the field replaceable unit to operate the network element. Otherwise, the network element disables the field replaceable unit.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
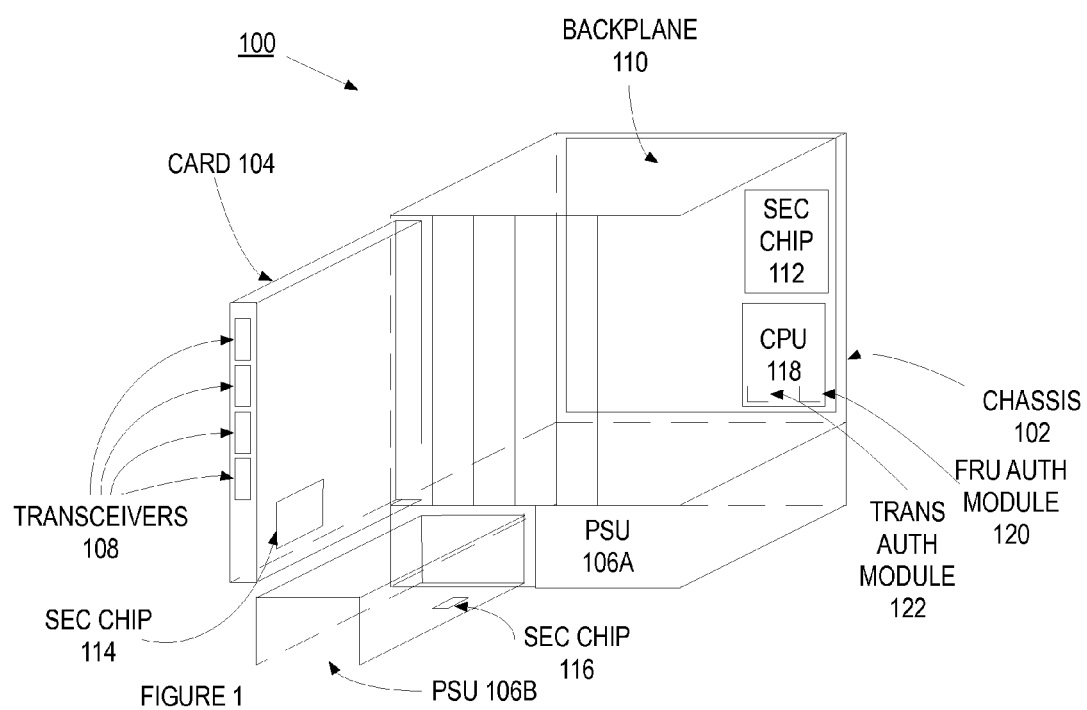
FIG. 1 is an illustration of one embodiment of a multi-card network element that includes transceivers and a security chip for the field replaceable units.

A method and apparatus of a network element that authenticates a transceiver and/or a field replaceable unit of the network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that authenticates a transceiver and/or a field replaceable unit of the network element is described. In one embodiment, a network element detects a transceiver that is not authenticated and is coupled to the network element. In this embodiment, the network element authenticates this transceiver using data stored in the transceiver and data securely stored in the network element. In one embodiment, to determine if a transceiver is authentic, a global secret key is generated. This global secret key is used to encrypt a transceiver module identifier of the transceiver. The encrypted transceiver module identifier is stored in the transceiver and the global secret key is stored in the security chip of the network element. The network element generates a signature from the data stored in the transceiver and a signature using data stored in the network element. If the signatures match, the transceiver is an authentic transceiver and the network element uses the transceiver to communicate network data. If the signatures do not match, the network element disables this transceiver.

In another embodiment, the network element determines if a field replaceable unit is authentic. In this embodiment, a field replaceable unit can be field replaceable units of a network element, such as removable line cards, control cards, power supplies, fan modules, the chassis, and/or the entire network element. In this embodiment, the network element detects a field replaceable unit that has not been authenticated and is coupled to the network element. To determine the authenticity of a field replaceable unit, the network element uses a secret key pair that is generated by the designer of the network element. During the manufacture of the field replaceable unit, a field replaceable unit key pair is generated and used to encrypt manufacturing data, where this key pair includes a private key and a public key. The private key is stored securely in the security chip of the field replaceable unit. The network element uses the private key to encrypt manufacturing data of the field replaceable unit during manufacture of the field replaceable unit and the encrypted data is stored in the security chip of the field replaceable unit. Once the network element is deployed with the field replaceable unit, the network element reconstructs the field replaceable unit manufacturing data and determines if this reconstructed data is the same as manufacturing data that is stored. If it is, the network element generates a signature using a nonce and the private key of the field replaceable unit. The network element further verifies this signature using the public field replaceable key. If the signature is verified, the network element uses this field replaceable unit. If not, the network element disables the field replaceable unit.

FIG. 1 is an illustration of one embodiment of a multi-card network element 100 that includes transceivers and a security chip for the field replaceable units. In FIG. 1, the network element 100 includes a chassis 102, one or more cards 104, and two power supply units 106A-B. In one embodiment, the chassis 102 is an integral framework that couples the one or more cards 104 and the two power supplies 106A-B via the backplane 110. In one embodiment, the backplane 110 is a group of electrical connectors in parallel with each other, so that each pin of each connector is linked to the same relative pin of all the other connectors forming a computer bus. It is used as a backbone to connect several components together to make up the network element. For example and in one embodiment, the backplane 110 couples the one or more cards 104, such that network traffic received on a port of one of the cards 104 can be processed and transmitted out of another port of the one or more cards 104. In another embodiment, the backplane 110 allows the chassis 102 and cards 104 to draw power from the power supplies 106A-B. In one embodiment, the backplane 110 includes a security chip 112 and a central processing unit (CPU) 118. In one embodiment, the security chip 112 is a chip that can store data securely and this stored data cannot be tampered with or be retrieved. In one embodiment, the security chip can perform operations using the stored data, but will not reveal the stored data directly. In addition, the security chip 112 can generate a key pair that is specific to this security chip. In this embodiment, this key pair can be used to determine if a field replaceable unit that includes the security chip is authentic. Furthermore, the security chip 112 can encrypt data with one or more of the key pair keys of the security chip 112.

In one embodiment, the CPU 118 is one or more processors that are used to manage and process the network data received and/or transmitted by the network element 100. In one embodiment, the CPU 118 determines if the field replaceable units and/or transceivers 108 are authentic or counterfeit by comparing information stored in the field replaceable unit or transceiver with information stored in and/or processed by the security chip 112. For example and in one embodiment, the security chip 112 includes a private key that can be used to encrypt data stored in the network element. This encrypted data can be used to compare with encrypted data stored in the field replaceable unit or transceiver. In one embodiment, the CPU 118 includes a field replaceable unit authentication module 120 that determines whether a field replaceable unit is an authentic field replaceable unit. In one embodiment, a field replaceable unit is a line card, control card, fabric card, chassis, power supply unit, or the entire network element. In another embodiment, the CPU 118 includes a transceiver authentication module 122 that determines if a transceiver is an authentic transceiver. Determining if a field replaceable unit or transceiver is authentic or counterfeit is further described in FIGS. 4AB, 5, 6AB, and 7 below.

In one embodiment, the network element 100 includes one or more cards 104. In this embodiment, each of the one or more cards 104 includes one or more transceivers 108 and a security chip 114. In one embodiment, each of the one or more transceivers 108 is a device that includes both a transmitter and a receiver of network data, which are combined and share common circuitry in a single housing. The transceiver 108 can be used to transmit and receive network data of different transport mediums (e.g., copper, optical, wireless, or another transport medium). For example and in one embodiment, the transceiver can be a Gigabit Interface Converter (GBIC), SFP, enhanced small form pluggable (SFP+), quad small form pluggable (QSFP+), 10 Gigabit Small Form Factor Pluggable (XFP), C form-factor pluggable (CFP), and/or another type of transceiver. While in one embodiment, each of the one or more transceivers 108 is the same type, in other embodiments, the one or more transceivers 108 can be a mixture of different types. In one embodiment, each of the transceivers can include local storage that is used to store information. In this embodiment, the information is used to determine if each of the transceiver 108 is an authentic transceiver. An example of the one or more transceivers 108 is further described in FIG. 3 below. In one embodiment, the security chip 114 is a chip that can store data securely and this stored data cannot be tampered with or be retrieved. In addition, the security chip 114 can generate a key pair that is specific to this security chip. In this embodiment, this key pair can be used to determine if a field replaceable unit that includes the security chip is authentic. Furthermore, the security chip 114 can encrypt data with one or more of the key pair keys of the security chip 114.

In one embodiment, the network element 100 includes multiple power supply units 106A-B. In one embodiment, each of the power supply units 106A-B includes a security chip 116. In this embodiment, the security chip 116 is a chip that can store data securely and this stored data cannot be tampered with or be retrieved. In addition, the security chip 116 can generate a key pair that is specific to this security chip. In this embodiment, this key pair can be used to determine if a field replaceable unit that includes the security chip is authentic. Furthermore, the security chip 116 can encrypt data with one or more of the key pair keys of the security chip 116.

In one embodiment, each of the security chips 112, 114, and 116 can securely store information that is used by the CPU 118 to determine if the field replaceable unit and/or transceiver are an authentic component. In one embodiment, an authentic component is a component that is manufactured by or for the producer of the network element. In another embodiment, each of the security chips 112, 114, and 116 includes one or more private keys that can be used to encrypt information. For example and in one embodiment, each of the security chips 112, 114, and/or 116 can store a private key for encrypting data and encrypted data for security comparisons.

Figure 2:
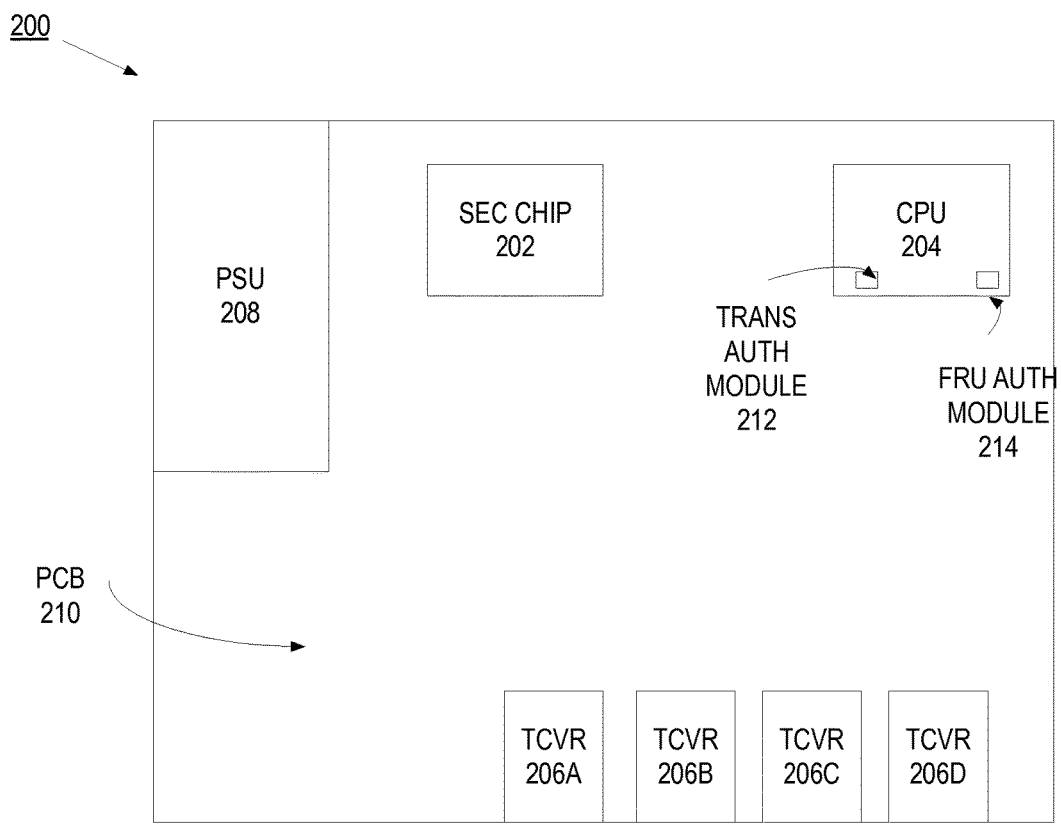
FIG. 2 is an illustration of embodiments of a single card network element that includes transceivers and a security chip for the network element.

In the description above, the network element 100 can include multiple field replaceable units. In another embodiment, the entire network element is a field replaceable unit, such as a single card network element. In one embodiment, a single card network element is a 1U high sized component that does not include any other field replaceable unit other than the network element itself. In another embodiment, the single card network element can include field replaceable units (e.g., fan module and/or power supply unit). FIG. 2 is an illustration of embodiments of a single card network element 200 that includes transceivers and a security chip for the network element. In FIG. 2, the network element 200 includes a security chip 202, a CPU 204, transceivers 206A-D, power supply unit 208, and printed circuit board (PCB) 210. In one embodiment, the security chip 202 is a chip that can store data securely and this stored data cannot be tampered with or be retrieved. In addition, the security chip 202 can generate a key pair that is specific to this security chip. In this embodiment, this key pair can be used to determine if a field replaceable unit that includes the security chip is authentic. Furthermore, the security chip 202 can encrypt data with one or more of the key pair keys of the security chip 202. In one embodiment, the CPU 204 is one or more processors that are used to manage and process the network data received and/or transmitted by the network element 200. In one embodiment, the CPU 204 determines if the network element 200 and/or transceivers 206A-D are authentic or counterfeit by comparing information stored in the network element or transceiver with information stored in and/or processed by the security chip 202. For example and in one embodiment, the security chip 202 includes a private key that can be used to encrypt data stored in the network element 200. This encrypted data can be used to compare with encrypted data stored in the network element 200 or transceivers 206A-D. In one embodiment, the CPU 204 includes a field replaceable unit authentication module 214 that determines whether network element 200 is an authentic network element. In another embodiment, the CPU 204 includes a transceiver authentication module 212 that determines if a transceiver is an authentic transceiver. Determining if a network element or transceiver is authentic or counterfeit is further described in FIGS. 4AB, 5, 6AB, and 7 below.

While in one embodiment, the network element 200 is illustrated with four transceivers 206A-D, in alternate embodiments, the network element can include a larger or smaller number of transceivers. In one embodiment, each of the transceivers 206A-D is a device that includes both a transmitter and a receiver of network data, which are combined and share common circuitry or a single housing. The transceivers 206A-D can be used to transmit and receive network data of different transport mediums (e.g., copper, optical, wireless, or another transport medium). For example and in one embodiment, the transceiver may be a GBIC, SFP, SFP+, QSFP+, XFP, CFP, and/or another type of transceiver. While in one embodiment, each of the transceivers 206A-D is the same type, in other embodiments, the transceivers 206A-D can be a mixture of different types. In one embodiment, each of the transceivers 206A-D can include local storage that is used to store information. In this embodiment, the information is used to determine if each of the transceivers 206A-D is an authentic transceiver. An example of the one or more transceivers is further described in FIG. 3 below. In one embodiment, the network element 200 further includes a power supply unit 208 that provides power to components of the network element 200.

Figure 3:
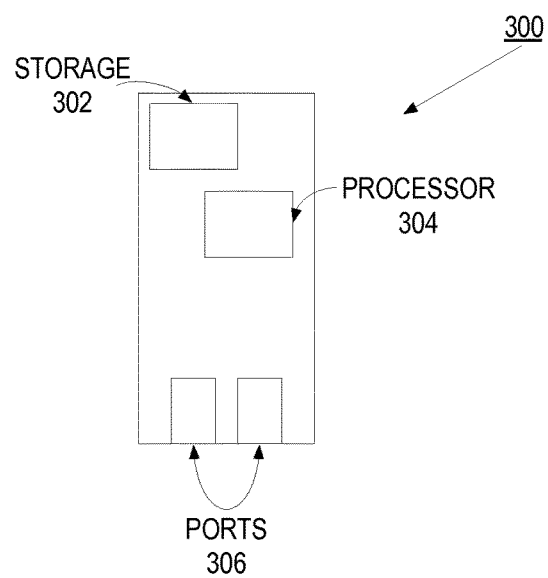
FIG. 3 is a block diagram of a transceiver.

As described above, each of the transceivers described in FIGS. 1 and 2 can include storage to store information that is used to determine if the transceiver is an authentic transceiver. FIG. 3 is a block diagram of a transceiver 300. In FIG. 3, the transceiver 300 includes storage 302, processor 304, and ports 306. In one embodiment, the storage is used to store information in the transceiver. In this embodiment, this information can be used to determine if the transceiver is authentic. In one embodiment, the processor 304 is a processor that is used to process network data that is transmitted and received by the transceiver 300. In one embodiment, ports 306 include one or more ports to receive the network data and one or more ports to transmit the network data. In one embodiment, storage 302 and processor 304 can be included in one chip.

As described above, the network elements illustrated in FIGS. 1 and 2 each include one or more security chips that store and/or encrypt data that can be used to determine if a field replaceable unit and/or transceiver is authentic. In one embodiment, to determine if a transceiver is authentic, a global secret key is generated. This global secret key is used to encrypt a transceiver module identifier of the transceiver. The encrypted transceiver module identifier is stored in the transceiver and the global secret key is stored in the security chip of the network element. The network element generates a signature from the data stored in the transceiver and a signature using data stored in the network element. If the signatures match, the transceiver is an authentic transceiver and the network element uses the transceiver to communicate network data. If the signatures do not match, the network element disables this transceiver.

Figure 4A:
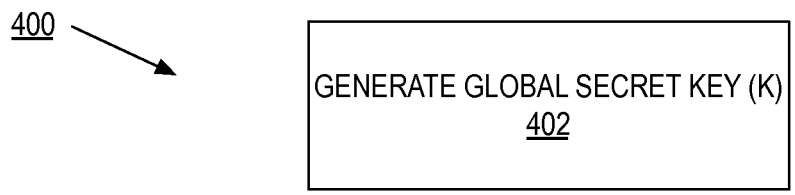
FIG. 4A is a flow diagram of one embodiment of a process to generate a global secret key pair.

FIG. 4A is a flow diagram of one embodiment of a process 400 to generate a global secret key pair. In one embodiment, process 400 is performed prior to the transceiver being manufactured. For example and in one embodiment, a designer of the network element for which the transceiver is intended performs process 400. In FIG. 4A, process 400 generates a global secret key, K, at block 402. In one embodiment, the global secret key can be used to encrypt data for the signatures that are computed by the network element. In one embodiment, the global secret key is a private key and is global for network elements that can use this transceiver. For example and in one embodiment, a network element producer that produces many different network elements (e.g., 1U switch or router, multi-card switch or router, or another type of network element, and/or different models or product lines of network elements), in which the manufactured transceivers can work in or more of these different network elements. In this example, the global secret key is used with each of the network elements that can work with this transceiver. In one embodiment, the global secret key is one of many global secret keys that are available to use. In this embodiment, each global secret key is associated with a generation identifier and the generation identifier is used to select the appropriate global secret key for transceiver authentication.

Figure 4B:
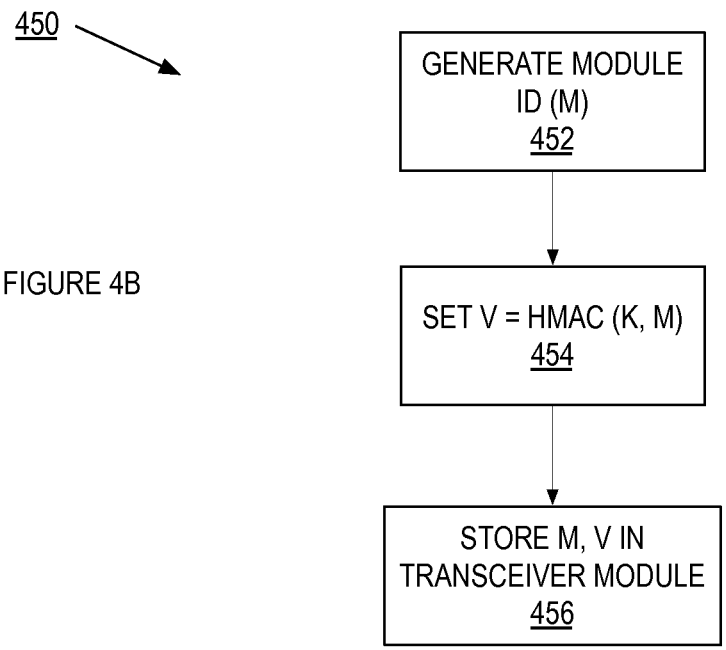
FIG. 4B is a flow diagram of one embodiment of a process to generate the transceiver manufacturing data.

FIG. 4B is a flow diagram of one embodiment of a process 450 to generate the transceiver manufacturing data. In one embodiment, process 450 is performed during the manufacturing of the transceiver. In this embodiment, the data used by the network element to generate the signatures during run-time is created and stored in the transceiver during the manufacturing process of the transceiver. In FIG. 4B, process 450 begins by generating a module identifier, M, for the transceiver at block 452. In one embodiment, the module identifier, M, is a 20-bit identifier that is used to uniquely identify the transceiver module. In another embodiment, the module identifier, M, can be another type of identifier. At block 454, process 450 sets a value V to be a secure hash of the module identifier, M, and the global secret key. In one embodiment, process 450 uses Keyed-Hashing for Message Authentication (HMAC) for the secure hash. In this embodiment, process 450 uses HMAC for data integrity and authentication using a cryptographic hash function. Alternatively, process 450 uses a different secure hash algorithm as a secure hash.

At block 456, process 450 stores M and V in the transceiver module. In one embodiment, process 450 stores this data in the storage of the transceiver, such as the storage 302 of transceiver 300 as described in FIG. 3 above. In one embodiment, K is stored securely in the field replaceable unit, which is used to authenticate a transceiver. In one embodiment, storing of K in the security chip of the field replaceable unit can happen when the field replaceable unit is manufactured. In this embodiment, this K storage occurs independent of process 450.

Figure 5:
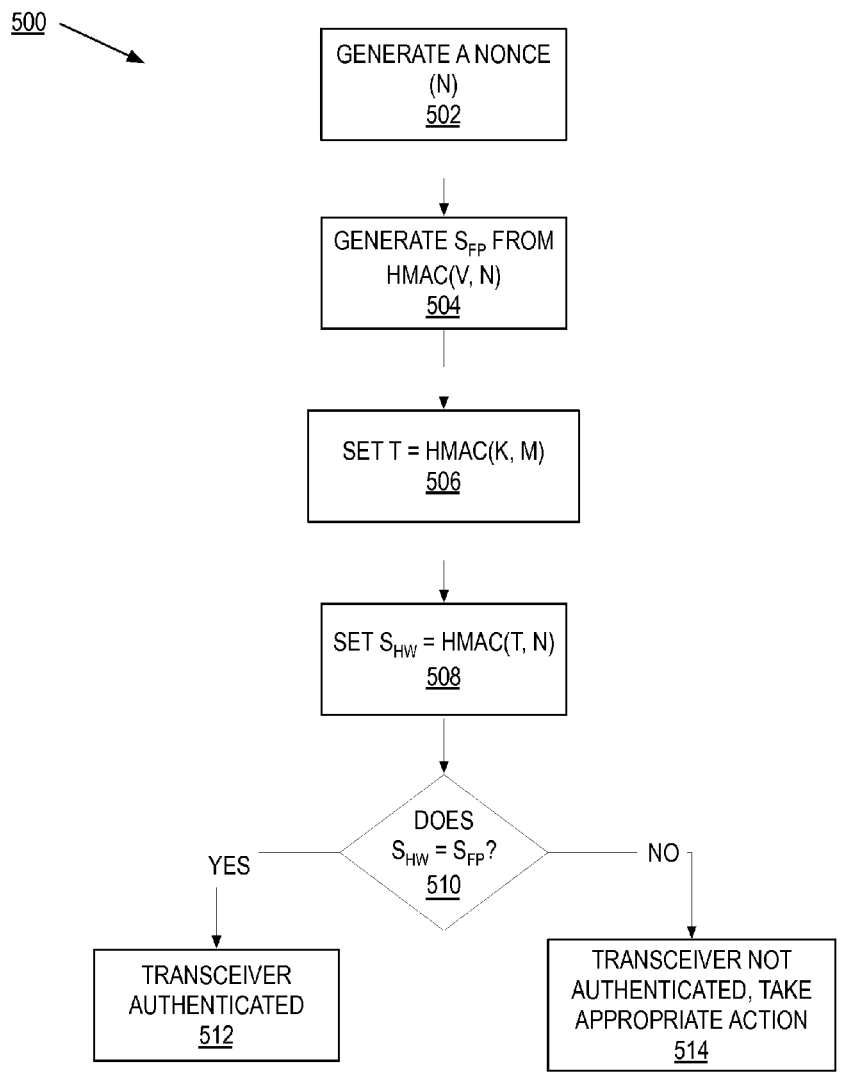
FIG. 5 is a flow diagram of one embodiment of a process to authenticate the transceiver.

Using the data generated for the transceiver during the transceiver manufacturing, the network element can use this data to determine if the transceiver is authentic. FIG. 5 is a flow diagram of one embodiment of a process 500 to authenticate the transceiver. In one embodiment, process 500 is performed by the transceiver authentication module 122 of FIG. 1 or the by the transceiver authentication module 212 of FIG. 2. In one embodiment, process 500 is performed during run-time of the network element when the transceiver is detected by the network element (e.g., when the network element detects the transceiver being powered on). In one embodiment, the transceiver can be detected and start to process network data as the transceiver is being authenticated. In another embodiment, process 500 authenticates the transceiver before starting to process network data. In one embodiment, process 500 is performed each time the transceiver is powered up. In another embodiment, process 500 is performed the first time the transceiver is powered up. In this embodiment, this transceiver is remembered as being previously authenticated and this process to authenticate is not performed. In FIG. 5, process 500 begins by generating a nonce, N, at block 502. In one embodiment, a nonce is an arbitrary number used once in a cryptographic communication. In this embodiment, process 500 uses the nonce to determine the authenticity of the transceiver based on a random number. This is used to determine authenticity of the transceiver at run-time. In one embodiment, process 500 uses the nonce so that that transceiver authentication can use random data generated at run-time and not solely base the authentication process on stored data. Process 500 generates a functional part signature using the value V and the nonce, N at block 504. In one embodiment, this functional part signature is a signature generated from transceiver stored information and is used to compare with a signature generated from information stored on the network element.

At block 506, process 500 generates a value T from the global secret key K stored in the network element and the module identifier, M. In one embodiment, process 500 generates T using a secure hash (e.g., HMAC or another type of secure hash). In one embodiment, the global secret key is stored in the security chip of the network element. In this embodiment, process 500 generates T by requesting that the security chip encrypt M using the stored global secret key. Process 500 generates a hardware signature from T and the nonce using a secure hash at block 508. In one embodiment, process 500 uses HMAC secure or another type of secure hash to generate the hardware signature. In one embodiment, the hardware signature is a signature generated from data stored in the network element, including data stored securely.

At block 510, process 500 compares the functional part signature and the hardware signature. If the signatures match, at block 512 and in one embodiment, process 500 authenticates the transceiver and the network element uses the transceiver for communicating network data. If the signatures do not match, at block 514 and in one embodiment, process 500 determines that the transceiver is not authenticated and takes appropriate action. In one embodiment, process 500 disables the transceiver so that this transceiver is not used by the network element. In another embodiment, process 500 can take additional or different action (e.g., raise an alarm, log the event, send an email, and/or another action to indicate that the transceiver is not authenticated).

As described above, a network element can use data stored in the transceiver and a security chip to determine if a transceiver is authentic. In another embodiment, the network element can use information securely stored in a field replaceable unit to determine if the field replaceable unit is authentic. To determine the authenticity of a field replaceable unit, the network element uses a secret key pair that is generated by the designer of the network element. In one embodiment, the secret key pair is one of a pair of keys that include a public key and a private key. In this embodiment, the private key is kept confidential and is stored securely. The public key can be published or stored in an insecure manner. Data encrypted by the private key can be decrypted by the public key and vice versa. During the manufacture of the field replaceable unit, a field replaceable unit key pair is generated and used to encrypt manufacturing data, where this key pair includes a private key and a public key. The private key is stored securely in the security chip of the field replaceable unit. In one embodiment, the public key is stored in an EEPROM in the field replaceable unit. The network element uses the private key to encrypt manufacturing data of the field replaceable unit during manufacture of the field replaceable unit and the encrypted data is stored in the EEPROM of the field replaceable unit. Once the network element is deployed with the field replaceable unit, the network element reconstructs the field replaceable unit manufacturing data and determines if this reconstructed data is the same as manufacturing data that is stored on the field replacement unit. If it is, the network element asks the security chip of the field replaceable unit to sign a nonce using the private key of the field replaceable unit. The network element further verifies this signature using the public field replaceable key. If the signature is verified, the network element uses this field replaceable unit. If not, the network element disables the field replaceable unit.

Figure 6A:
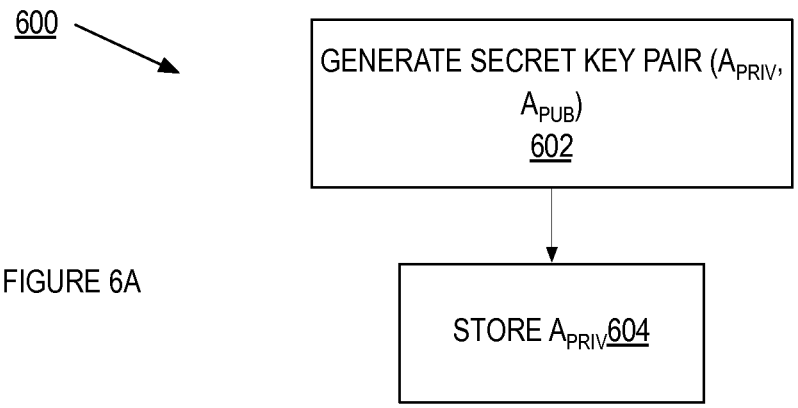
FIG. 6A is a flow diagram of one embodiment of a process to generate a global secret key.

FIG. 6A is a flow diagram of one embodiment of a process 600 to generate a global secret key pair. In one embodiment, process 600 is performed prior to the field replaceable unit being manufactured. For example and in one embodiment, a designer of the network element for which the field replaceable unit is intended performs process 600. In FIG. 6A, process 600 generates a secret key pair, $A_{priv}$ and $A_{pub}$, at block 602. In one embodiment, $A_{priv}$ is a private key and $A_{pub}$ a public key. In this embodiment, $A_{priv}$ is kept confidential and is stored securely. $A_{pub}$ can be published or is not needed to be stored securely. Data encrypted by $A_{priv}$ can be decrypted by $A_{pub}$ and vice versa. In one embodiment, the secret key pair is global for the manufacture of the field replaceable units. In one embodiment, $A_{priv}$ and $A_{pub}$ is an RSA key pair. In one embodiment, $A_{priv}$ is preloaded onto the security chip. In one embodiment, the security chip vendor loads $A_{priv}$ onto the security chip as part of the manufacture of the security chip. At block 604, process 600 loads $A_{priv}$ onto the security chip.

Figure 6B:
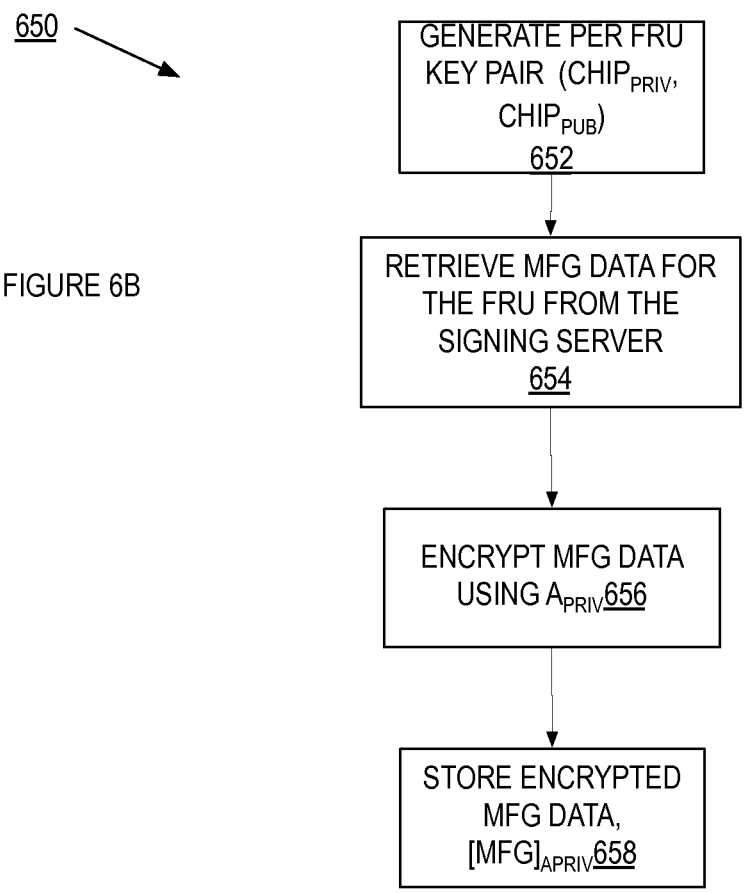
FIG. 6B is a flow diagram of one embodiment of a process to generate the field replaceable unit manufacturing data.

FIG. 6B is a flow diagram of one embodiment of a process 650 to generate the field replaceable unit manufacturing data. In one embodiment, process 650 is performed during the manufacturing test of the field replaceable unit. In this embodiment, the data is used by the network element to generate the specific field replaceable unit key pair that is used to encrypt the manufacturing data. These keys are stored in the field replaceable unit during the manufacturing process of the field replaceable unit. In FIG. 6B, process 650 begins by generating the field replaceable unit key pair, $Chip_{priv}$ and $Chip_{pub}$ at block 652. In one embodiment, $Chip_{priv}$ and $Chip_{pub}$ is an RSA key pair. In one embodiment, $Chip_{priv}$ is a private key and $Chip_{pub}$ is the corresponding public key that is generated for the field replaceable unit. In this embodiment, this key pair is unique to the field replaceable unit and other field replaceable units will have a different key pair. In one embodiment, process 650 generates this key pair by making a request to the security chip on the field replaceable unit to generate the key pair. For example and in one embodiment, process 650 makes a request to the security chip installed on the field replaceable unit and this security chip generates the key pair. In this example, $Chip_{priv}$ remains stored securely on the security chip and cannot be retrieved. This key can be used to encrypt data via requests made to the security chip. The corresponding public key, $Chip_{pub}$, can be retrieved from the security chip and be used to decrypt data that is encrypted by the security chip with $Chip_{priv}$.

At block 654, process 650 retrieves the manufacturing data from a manufacturing server. In one embodiment, the manufacturing data is data that characterizes the particular field replaceable unit. For example and in one embodiment, the manufacturing data is serial number of the field replaceable unit, manufacturing date, model information, Media Access Control (MAC) address, $Chip_{pub}$, and/or any other data for the field replacement unit that is set at manufacturing time. In one embodiment, the manufacturing data can be large. In this embodiment, process 650 computes a hash of the manufacturing data. In one embodiment, process 650 computes a secure hash, such as SHA-1 secure hash.

Process 650 encrypts the manufacturing data using $A_{priv}$ at block 656. In one embodiment, process 650 uses $A_{priv}$ to encrypt the manufacturing data because by using $A_{priv}$ to encrypt the manufacturing data, process 650 indicates this encrypted manufacturing data comes from the manufacturer. In this embodiment, using $Chip_{priv}$ to encrypt the manufacturing data does not indicate that the manufacturing data necessarily came from the manufacturer as $Chip_{priv}$ is specific to the processor and not the manufacturer. In one embodiment, process 650 sends the manufacturing data to a manufacturing server that stores $A_{priv}$. In this embodiment, the manufacturing server encrypts the manufacturing data using $A_{priv}$ and returns the encrypted manufacturing data to process 650. In another embodiment, process 650 encrypts the hash of the manufacturing data. At block 656, process 650 stores the manufacturing data and the encrypted manufacturing data. In one embodiment, process 650 stores this manufacturing data and the encrypted manufacturing data in storage of the field replaceable unit. In another embodiment, process 650 stores the encrypted manufacturing data hash. In one embodiment, process 650 stores $Chip_{pub}$, the manufacturing data, and the encrypted manufacturing data (or encrypted manufacturing data hash) in an EEPROM of the field replaceable unit.

Figure 7:
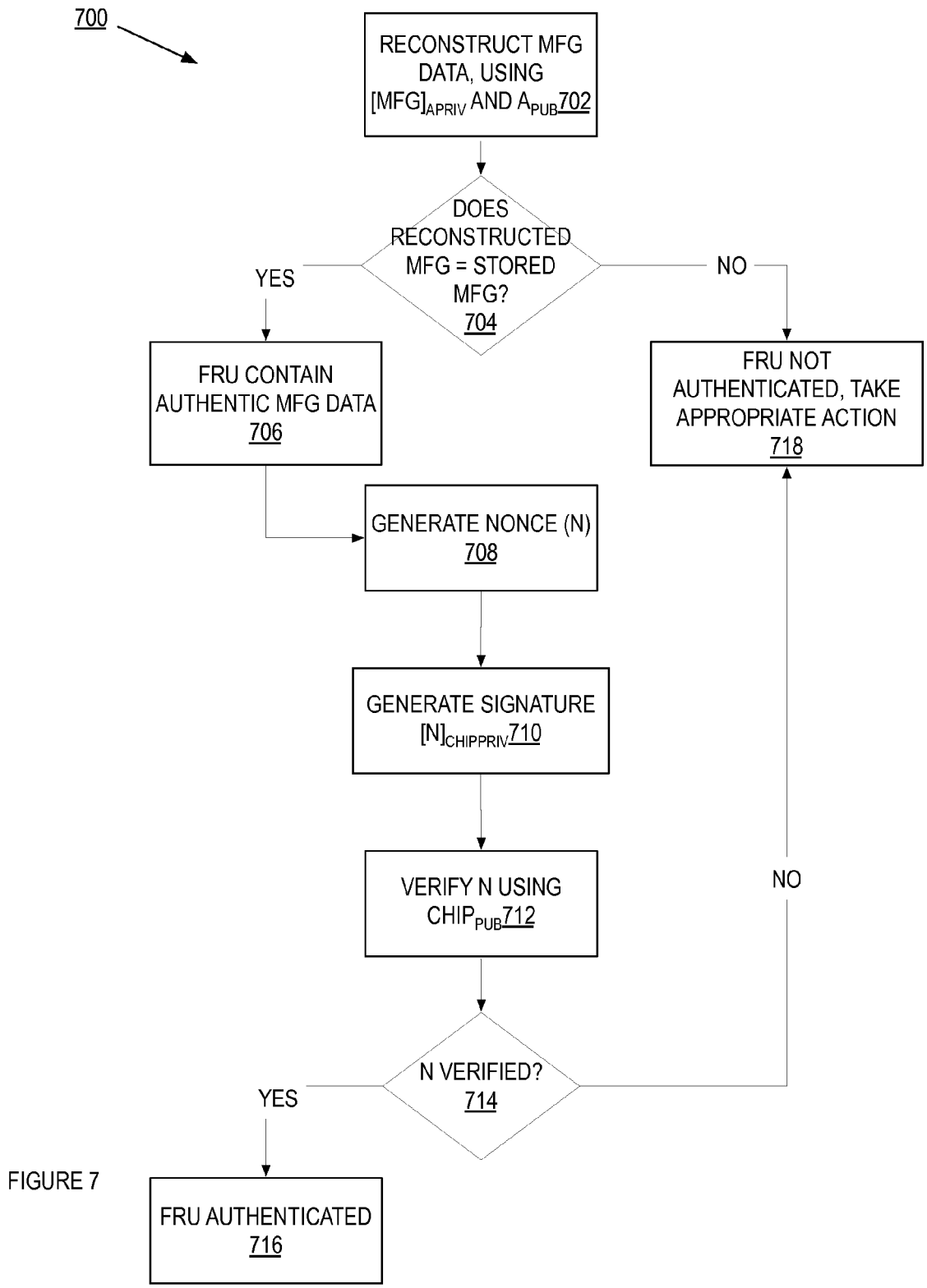
FIG. 7 is a flow diagram of one embodiment of a process to authenticate the field replaceable unit.

Using the data generated for the field replaceable unit during the field replaceable unit manufacturing, the network element can use this data to determine if the field replaceable unit is authentic. FIG. 7 is a flow diagram of one embodiment of a process 700 to authenticate the field replaceable unit. In one embodiment, process 700 is performed by the field replaceable unit authentication module 120 of FIG. 1 or the by the field replaceable unit authentication module 214 of FIG. 2. In one embodiment, process 700 is performed during run-time of the network element when the field replaceable unit is detected by the network element. In one embodiment, the field replaceable unit can be detected and start to process network data (if applicable) as the field replaceable unit is being authenticated. In another embodiment, process 700 authenticates the field replaceable unit before starting to process network data. In one embodiment, process 700 is performed each time the field replaceable unit is powered up or taken out of reset. In another embodiment, process 700 is performed the first time the field replaceable unit is powered up. In this embodiment, this field replaceable unit is remembered as being previously authenticated and this process to authenticate is not performed. In FIG. 7, process 700 begins by reconstructing the encrypted manufacturing data that is stored on the field replaceable unit at block 702. In one embodiment, process 700 uses the public key, $A_{pub}$, to decrypt the encrypted manufacturing data. In this embodiment, if the encrypted manufacturing data is indeed encrypted with the private key, $A_{priv}$, that corresponds to the public key, $A_{pub}$, the manufacturing data will be recovered. For example and in one embodiment, process 700 decrypts the encrypted manufacturing data by reading out the encrypted manufacturing data with $A_{pub}$. In one embodiment, if the encrypted manufacturing data is an encrypted hash of the manufacturing data, the reconstructed manufacturing data is a hash of the manufacturing data. In addition, at block 702, process 700 reads the manufacturing data from the field replaceable unit storage. In this embodiment, process 700 reads the model number, serial number, MAC address, $Chip_{pub}$, and/or any other manufacturing data that is stored. In one embodiment, process 700 reads the manufacturing data from the EEPROM of the field replaceable unit. In one embodiment, if the encrypted manufacturing data is stored as an encrypted hash of the manufacturing data, process 700 computes a hash of the stored manufacturing data and uses this hash to compare with the reconstructed manufacturing data. At block 704, process 700 compares the reconstructed manufacturing data with the stored manufacturing data. If the reconstructed manufacturing data is different from the stored manufacturing data, execution proceeds to block 718 below.

If the reconstructed manufacturing data is the same as the stored manufacturing data, at block 706, process 700 determines that the field replaceable unit includes authentic manufacturing data. In this embodiment, if the field replaceable unit includes authentic manufacturing data, it indicates that the field replaceable unit includes properly manufactured data and that the manufacturing data was signed by manufacturing server. This further indicates that the manufacturing data stored on the field replaceable unit is genuine. However, this data may have been cloned from another field replaceable unit, in which case, the field replaceable unit being tested may not be an authentic part. To further determine if the tested field replaceable unit is authentic, process 700 performs an additional test using the keys that were generated for the field replaceable unit at the manufacturing of the field replacement unit.

At block 708, process 700 generates a nonce, N. In one embodiment, a nonce is an arbitrary number used once in a cryptographic communication. In this embodiment, process 700 uses the nonce to determine the authenticity of the field replaceable unit based on a random number. The nonce can be used to check the authenticity of the field replaceable unit at the time the field replacement unit is being used. In one embodiment, process 700 uses the nonce so that that field replacement unit authentication can use random data generated at run-time and not solely base the authentication process on stored data. Process 700 generates a signature, $[N]_{Chip_{priv}}$, using the private key of the security chip of the field replacement unit at block 710. In one embodiment, the syntax $[N]_{Chip_{priv}}$ means that the nonce, N, is encrypted using the private key of the security chip, $Chip_{priv}$. In one embodiment, if the data stored on the field replacement unit is cloned from another field replacement unit, the private and public keys stored in the security chip and the field replacement unit storage will not be a valid key pair. Thus, the data encrypted by the private key, $Chip_{priv}$, cannot be decrypted by the public key, $Chip_{pub}$. In one embodiment, process 700 generates this signature by requesting that the security chip of the field replaceable unit encrypt N using $Chip_{pub}$ stored on this security chip. At block 712, process 700 verifies N using the public key, $Chip_{pub}$. In one embodiment, process 700 reads out the data after applying $Chip_{pub}$ to the encrypted nonce, N, such as $[[N]_{Chip_{priv}}]_{Chip_{pub}}$. In one embodiment, the syntax $[[N]_{Chip_{priv}}]_{Chip_{pub}}$ means that the nonce, N, is encrypted using the private key of the security chip, $Chip_{priv}$ and the result is decrypted using the public key of the security chip, $Chip_{pub}$. Process 700 determines if N is verified by comparing the recovered value of N with the original N at block 714. If N is verified, at block 716, process 700 determines that the field replacement unit is authenticated and uses the field replacement unit for communicating network data. Having a verified N means that the manufacturing data stored on the field replaceable unit is specific to the security chip of the field replaceable unit and that the field replaceable unit is a genuinely manufactured field replaceable unit. If N is not verified, execution proceeds to block 718. At block 718, process 700 determines that the field replacement unit is not authenticated and takes appropriate action. In one embodiment, process 700 disables the field replacement unit so that this field replacement unit is not used by the network element. In another embodiment, process 700 can take additional or different action (e.g., raise an alarm, log the event, send an email, and/or another action to indicate that the transceiver is not authenticated).

Figure 8:
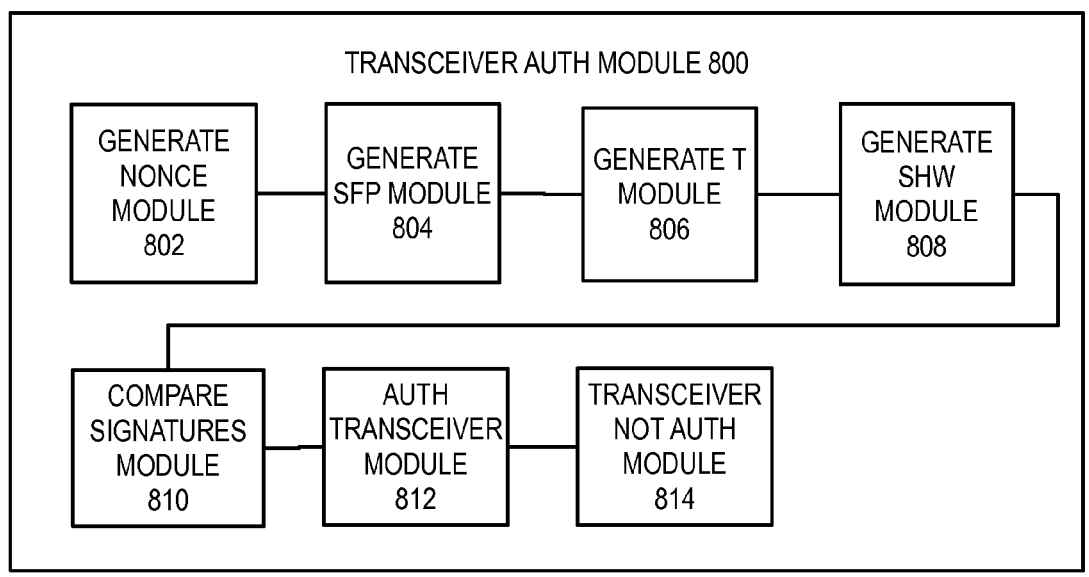
FIG. 8 is a block diagram of a field replaceable unit authentication module that authenticates a field replaceable unit.

FIG. 8 is a block diagram of a transceiver authentication module 800 that authenticates a transceiver. In one embodiment, the transceiver authentication module 800 is the transceiver authentication module 122 of FIG. 1 or the transceiver authentication module 212 of FIG. 2. In one embodiment, the transceiver authentication module 800 includes a generate nonce module 802, generate SFP module 804, generate T module 806, generate SHW module 808, compare signatures module 810, authenticate transceiver module 812, and transceiver not authenticated module 814. In one embodiment, the generate nonce module 802 generates a nonce as described in FIG. 5, block 502 above. The generate SFP module 804 generates the functional part signature as described in FIG. 5, block 504 above. The generate T module 806 generates the value T as described in FIG. 5, block 506 above. The generate SHW module 808 generates a hardware signature as described in FIG. 5, block 508 above. The compare signatures module 810 compares the signatures as described in FIG. 5, block 510 above. The authenticate transceiver module 812 authenticates the transceiver as described in FIG. 5, block 512 above. The transceiver not authenticated module 814 determines that transceiver is not authenticated and takes appropriate action as described in FIG. 5, block 514 above.

Figure 9:
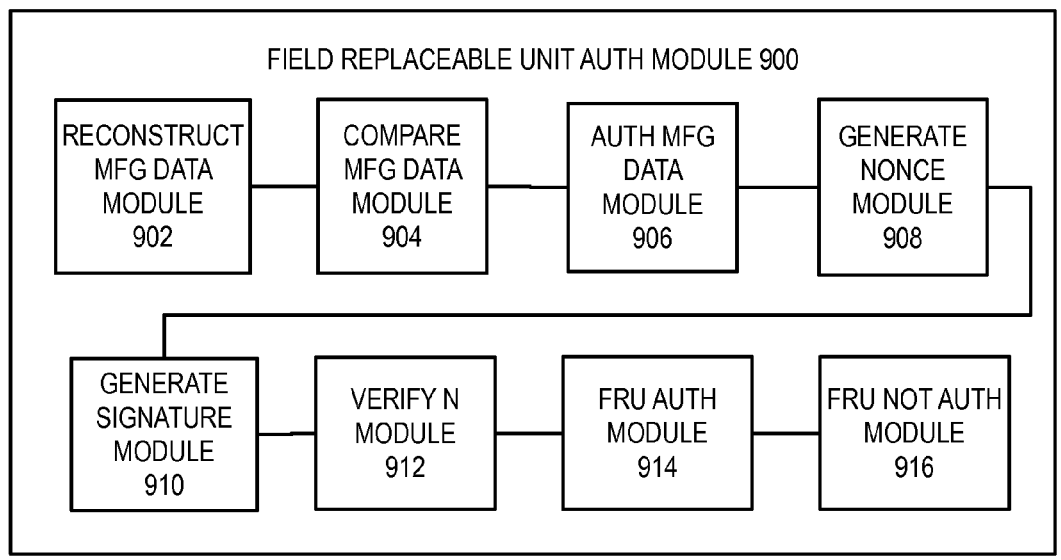
FIG. 9 is a block diagram of a transceiver authentication module that authenticates a transceiver.

FIG. 9 is a block diagram of a field replaceable unit authentication module 900 that authenticates a field replaceable unit. In one embodiment, the field replaceable unit authentication module 900 is the field replaceable unit authentication module 120 of FIG. 1 or the field replaceable unit authentication module 214 of FIG. 2. In one embodiment, the field replaceable unit authentication module 900 includes reconstruct manufacturing data module 902, compare manufacturing data module 904, authenticate manufacturing data module 906, generate nonce module 908, generate signature module 910, verify N module 912, FRU authenticate module 914, and FRU not authenticated module 916. In one embodiment, reconstruct manufacturing data module 902 reconstructs the manufacturing data as described in FIG. 7, block 702 above. The compare manufacturing data module 904 compares the stored and reconstructed manufacturing data as described in FIG. 7, block 704 above. The authenticate manufacturing data module 906 authenticates the manufacturing data as described in FIG. 7, block 706 above. The generate nonce module 908 generates the nonce N as described in FIG. 7, block 708 above. The generate signature module 910 generates a signature using N as described in FIG. 7, block 710 above. The verify N module 912 verifies N as described in FIG. 7, block 712 above. The FRU authenticate module 914 authenticates the field replaceable unit as described in FIG. 7, block 716 above. The FRU not authenticated module 916 that the field replaceable unit is not authenticated and takes appropriate action as described in FIG. 7, block 718 above.

Figure 10:
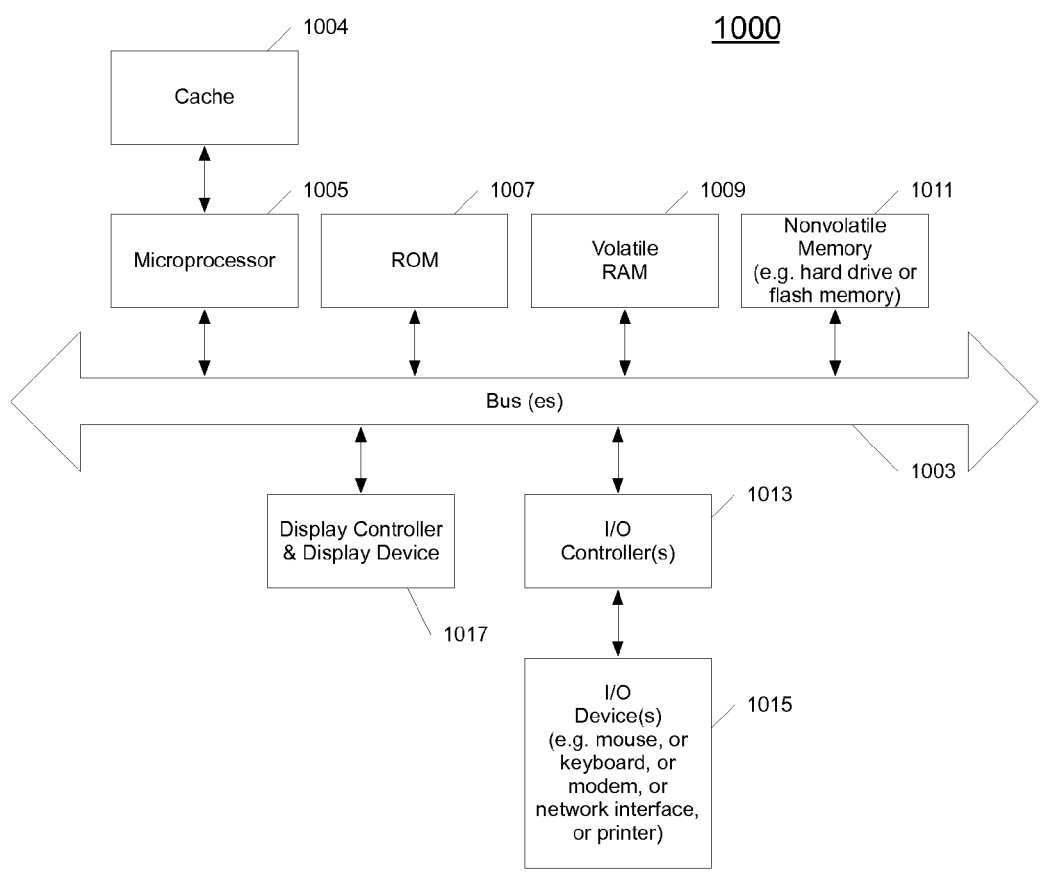
FIG. 10 illustrates one example of a typical computer system, which may be used in conjunction with the embodiments described herein.

FIG. 10 shows one example of a data processing system 1000, which may be used with one embodiment of the present invention. For example, the system 1000 may be implemented including a network element 100 as shown in FIG. 1 or network element 200 as shown in FIG. 2. Note that while FIG. 10 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1017 and to peripheral devices such as input/output (I/O) devices which may be mice, keyboards, modems, network interfaces, printers and other devices which are well known in the art. In one embodiment, the system 1000 includes a plurality of network interfaces of the same or different type (e.g., Ethernet copper interface, Ethernet fiber interfaces, wireless, and/or other types of network interfaces). In this embodiment, the system 1000 can include a forwarding engine to forward network date received on one interface out another interface.

Typically, the input/output devices 1015 are coupled to the system through input/output controllers 1013. The volatile RAM (Random Access Memory) 1009 is typically implemented as dynamic RAM (DRAM), which requires power continually in order to refresh or maintain the data in the memory.

The mass storage 1011 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1011 will also be a random access memory although this is not required. While FIG. 7 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 11:
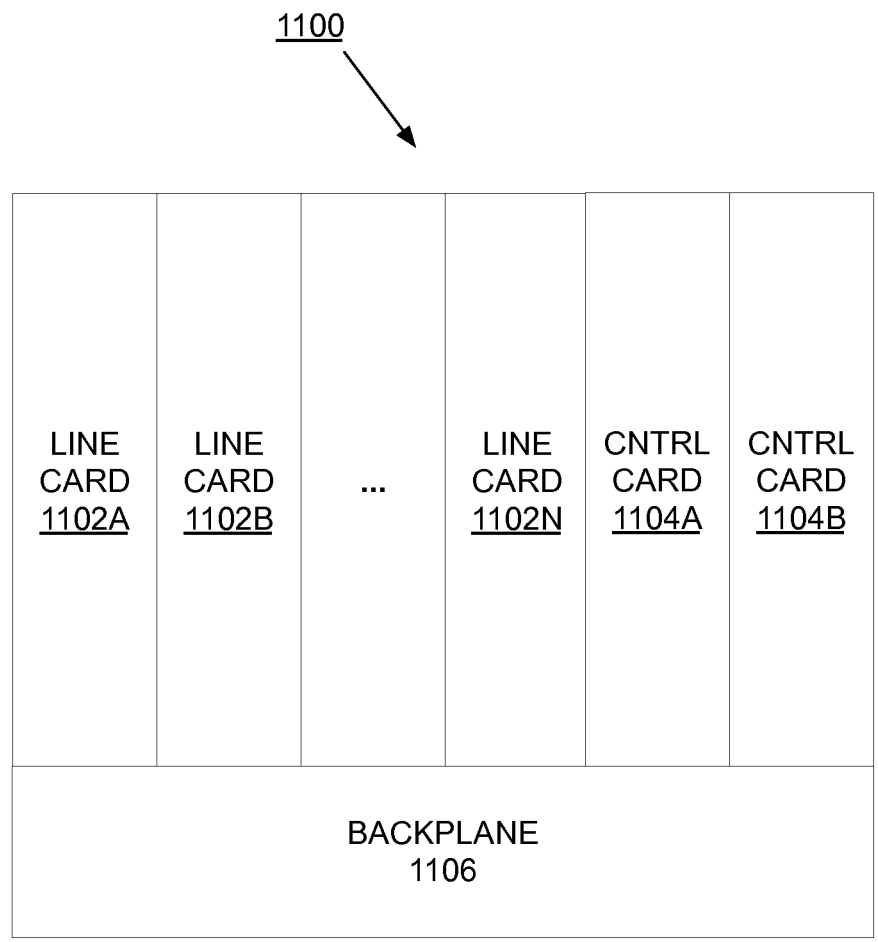
FIG. 11 is a block diagram of one embodiment of an exemplary network element that authenticates a transceiver and/or a field replaceable unit of the network element.

FIG. 11 is a block diagram of one embodiment of an exemplary network element 1100 that determines the authenticity of a transceiver and/or a field replaceable unit. In FIG. 11, the backplane 1106 couples to the line cards 1102A-N and controller cards 1104A-B. While in one embodiment, the controller cards 1104A-B control the processing of the traffic by the line cards 1102A-N, in alternate embodiments, the controller cards 1104A-B, perform the same and/or different functions (e.g., determining the authenticity of a transceiver and/or a field replaceable unit, etc.). In one embodiment, the line cards 1102A-N process and forward traffic according to the network policies received from controller cards the 1104A-B. In one embodiment, the controller cards 1104A-B determine the authenticity of a transceiver and/or a field replaceable unit as described in FIGS. 4AB, 5, 6AB, and 7 above. In this embodiment, one or both of the controller cards include the transceiver and/or field replacement unit module to determine the authenticity of a transceiver and/or a field replaceable unit, such as the transceiver authentication module 122 or field replaceable unit module 124 as described in FIG. 1 above. In another embodiment, the line cards 1102A-N determines the authenticity of a transceiver and/or a field replaceable unit as described in FIGS. 4AB, 5, 6AB, and 7 above. It should be understood that the architecture of the network element 1100 illustrated in FIG. 11 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating," "using," "determining," "computing," "detecting," "authenticating," "disabling," "comparing," "verifying," "communicating," "sending," "receiving," "decrypting," "reconstructing," "marking," "validating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to authenticate a removable transceiver coupled to a network element, the method comprising:
   receiving cryptographically signed transceiver data from the removable transceiver, wherein the cryptographically signed transceiver data is cryptographically signed with a key prior to the removable transceiver coupling to the network element using a type of cryptographic operation;
   generating a stored transceiver signature by re-cryptographically signing the cryptographically signed transceiver data using a nonce and the same type of cryptographic operation, the cryptographically signed transceiver data stored in the removable transceiver;
   generating a hardware transceiver signature using the nonce and data stored in a secure storage of the network element; and
   using the removable transceiver to communicate network data for the network element if the stored transceiver signature and the hardware transceiver signature are equal.

2. The non-transitory machine-readable medium of claim 1, further comprising:
disabling the removable transceiver if the stored transceiver signature and the hardware transceiver are not equal.

3. The non-transitory machine-readable medium of claim 1, wherein the cryptographically signed transceiver data stored in the removable transceiver includes a cryptographically signed transceiver module identification.

4. The non-transitory machine-readable medium of claim 3, wherein generating the stored transceiver signature comprises:
computing the stored transceiver signature using the cryptographically signed transceiver module identification and the nonce.

5. The non-transitory machine-readable medium of claim 3, wherein the cryptographically signed transceiver module identification is cryptographically signed with a global secret key.

6. The non-transitory machine-readable medium of claim 1, wherein the data stored in the secure storage includes a global secret key.

7. The non-transitory machine-readable medium of claim 6, wherein generating the hardware transceiver signature comprises:
computing a cryptographically signed module identification using the global secret key and a transceiver module identification; and
computing the hardware transceiver signature by re-cryptographically signing the cryptographically signed module identification using the nonce.

8. The non-transitory machine-readable medium of claim 6, wherein the global secret key is a public key created by a designer of the network element.

9. The non-transitory machine-readable medium of claim 6, wherein the removable transceiver is manufactured by a company that is different than the designer of the network element.

10. The non-transitory machine-readable medium of claim 6, wherein the global secret key is one of a plurality of available keys and each of the plurality of available keys includes a generation identifier.

11. A method to authenticate a removable transceiver coupled to a network element, the method comprising:
detecting the removable transceiver coupled to the network element, wherein the removable transceiver is not authorized to communicate traffic for the network element;
authenticating the removable transceiver by re-cryptographically signing cryptographically signed data stored in the removable transceiver using a type of cryptographic operation and using a key stored in the network element, wherein the cryptographically signed data is cryptographically signed with the key prior to the removable transceiver coupling to the network element using the same type of cryptographic operation;
communicating data using the removable transceiver if the removable transceiver is authenticated; and
disabling the removable transceiver if the removable transceiver is not authenticated.

12. The method of claim 11, wherein the cryptographically signed data is a cryptographically signed module identification of the removable transceiver.

13. The method of claim 11, wherein the authenticating comprises:
generating a nonce;
generating a stored transceiver signature using the cryptographically signed data stored in the removable transceiver and the nonce;
generating a hardware transceiver signature using the key stored in a secure storage of the network element and the nonce; and
comparing the stored transceiver signature and the hardware transceiver signature.

14. A network element to authenticate a removable transceiver coupled to the network element, the method comprising:
the removable transceiver to communicate network data for the network element; secure storage; and
a network card to authenticate the removable transceiver, the transceiver authentication module including,
a set of software instructions to generate a stored transceiver signature using cryptographically signed transceiver data stored in the removable transceiver by re-cryptographically signing the cryptographically signed transceiver data using a nonce and a type of cryptographic operation, wherein the cryptographically signed transceiver data is cryptographically signed with a key prior to the removable transceiver coupling to the network element using the same type of cryptographic operation,
a set of software instructions to generate a hardware transceiver signature using the nonce and data stored in the secure storage of the network element, and
a set of software instructions to use the removable transceiver to communicate network data for the network element if the stored transceiver signature and the hardware transceiver are equal.

15. The network element of claim 14, wherein the set of software instructions that uses the removable transceiver is further configured to disable the transceiver if the stored transceiver signature and the hardware transceiver are not equal.

16. The network element of claim 14, wherein the data stored in transceiver includes a cryptographically signed transceiver module identification.

17. The network element of claim 16, wherein the set of software that generates a stored transceiver signature is further configured to compute the stored transceiver signature using the cryptographically signed transceiver module identification and the nonce.

18. The network element of claim 16, wherein the cryptographically signed transceiver module identification is cryptographically signed with a global secret key prior to the removable transceiver coupling to the network element.

19. The network element of claim 14, wherein the data stored in the secure storage includes a global secret key.

20. The network element of claim 19, wherein the set of software instruction that generates a hardware signature is further configured to compute an cryptographically signed module identification using the global secret key and a transceiver module identification and computes the hardware transceiver signature by re-cryptographically signed the cryptographically signed module identification using the nonce.

* * * * *